United States Patent [19]

Gasman et al.

[11] 4,111,893

[45] Sep. 5, 1978

[54] POLYBUTYLENE TEREPHTHALATE MOLDING RESIN

[75] Inventors: Robert C. Gasman, W. Milford; John J. Charles, Bloomingdale, both of N.J.

[73] Assignee: GAF Corporation, New York, N.Y.

[21] Appl. No.: 798,808

[22] Filed: May 20, 1977

[51] Int. Cl.² .............................................. C08K 9/06
[52] U.S. Cl. .................................................. 260/40 R
[58] Field of Search ..................................... 260/40 R

[56] References Cited

U.S. PATENT DOCUMENTS

| | | | |
|---|---|---|---|
| 3,583,939 | 6/1971 | Bostick | 260/40 R X |
| 3,697,551 | 10/1972 | Thomson | 260/349 |
| 3,824,209 | 7/1974 | Anderson | 260/45.7 S |
| 4,018,738 | 4/1977 | Rawlings | 260/40 R |
| 4,022,748 | 5/1977 | Schlichting | 260/40 R |

FOREIGN PATENT DOCUMENTS 2,206,804  8/1973  Fed. Rep. of Germany ........ 260/40 R

OTHER PUBLICATIONS

McFarren, Sanderson, & Schappell, "Azidosilane Polymer-Filler Coupling Agent," *Polymer Eng. & Sci.,* v. 17, No. 1 (1977) pp. 46–49.

*Primary Examiner*—Sandra M. Person
*Attorney, Agent, or Firm*—Walter C. Kehm; Joshua J. Ward

[57] ABSTRACT

Polybutylene terephthalate molding resin, process for making same and molded products produced from such resin. The molding resin comprises an intimate blend of polybutylene terephthalate having an intrinsic viscosity between about 0.5 and about 1.5 deciliters per gram with mineral filler the individual particles of which are coated with sulfonyl azido alkyl trimethoxy silane coupling agent.

16 Claims, No Drawings

POLYBUTYLENE TEREPHTHALATE MOLDING RESIN

BACKGROUND OF THE INVENTION

Silane coupling agents have previously been used with significant success to chemically couple various resins to mineral filler materials such as glass and thereby upgrade the mechanical properties of glass reinforced epoxy and unsaturated polyester plastics. Although a great many of these well established coupling agents have been effective in coupling glass or other mineral fillers to resins such as nylon, they have been largely ineffective in coupling such fillers to less reactive thermoplastics such as polyolefins and thermoplastic polyesters. The lack of effectiveness of the traditional coupling agents in coupling polyolefins and thermoplastic polyesters to mineral filler materials is believed due to the inability of such couplers to chemically bond to these resins. Previous attemps to resolve this problem have included the use of special azido compounds such as those described in U.S. Pat. No. 3,766,216 to bond unreactive polymers to ethylenically unsaturated hydrocarbon silane treated glass filler. This of course requires the use of a conventional silane coupling agent in addition to the special azido compounds of the above mentioned patent.

The advantages of reinforcing polybutylene terephthalate (PBT) with mineral filler such as glass spheres or fibers has been recognized for some time. The use of glass fibers in PBT has been described for instance in U.S. Pat. No. 3,814,725. Unfortunately, no coupling agents have previously been known to be effective in satisfactorily coupling PBT to mineral fillers.

SUMMARY OF THE INVENTION

It is therefore an object of the present invention to provide an improved molding resin composition incorporating with PBT and mineral filler a coupling agent effective to chemically bond the PBT to the filler and thereby upgrade the mechanical properties of the filled resin composition.

In accordance with the invention, an improved molding resin composition is provided which comprises PBT having an intrinsic viscosity (IV) between about 0.5 and about 1.5 deciliters per gram (dl/g) intimately blended with mineral filler, the individual particles of which are coated with sulfonyl azido alkyl trimethoxy silane coupling agent. In preferred embodiments of the invention the mineral filler is glass spheres, acicular wollastonite, novaculite, or mica, or a mixture thereof and is present in amounts between about 1% and about 70 wt. % based on PBT with the coupling agent preferably being present in amounts between about 0.15 and about 2 pounds per hundred pounds (pph) based on mineral filler.

In accordance with the process of the invention, molding resin is prepared by intimately blending PBT having an IV between about 0.5 and about 1.5 with mineral filler, the individual particles of which are coated with the above described coupling agent. Product of the invention is molded PBT product produced from the molding composition of the invention.

DETAILED DESCRIPTION OF THE INVENTION

As mentioned above, molding resin of the invention comprises an intimate blend of PBT having an IV between about 0.5 and about 1.5 dl/g with mineral filler, the individual particles of which are coated with sulfonyl azido alkyl trimethoxy silane coupling agent. The alkyl portion of this coupling agent generally contains between 2 and about 10 carbon atoms. Coupling agent in which the alkyl portion is arylalkyl with between 7 and about 10 carbon atoms is for instance suitable. This particular coupling agent is well known as a coupling agent for resins in general but has now unexpectedly been found to be effective in coupling PBT to mineral fillers such as glass or wollastonite. This is especially surprising since other silane coupling agents are not known to be effective for this purpose.

PBT useful in compositions of the invention includes PBT resin having an intrinsic viscosity between about 0.5 and about 1.5 dl/g. Such PBT resins are well known and may be prepared in the conventional manner. Preparation of PBT is for instance described in U.S. Pat. No. 2,465,319, the disclosure of which is incorporated herein by reference. Intrinsic viscosities referred to herein are measured in a conventional manner using an 8 wt. % polymer solution in orthochlorophenol at 25° C.

Mineral filler used in molding resin compositions of the invention may be any of the mineral fillers conventionally used to reinforce PBT molding resin. While particle size and configuration is not considered critical to the invention, filler used preferably has an average particle diameter between about 0.1 and about 500 microns. Suitable fillers include for instance glass spheres, acicular wollastonite, mica, feldspar, novaculite, spodumene, etc. Glass may be used in the form of glass fibers or in other suitable forms such as microspheres. Mineral filler is preferably used in the molding resin compositions of the invention in amounts between about 5% and about 50 wt. % based on PBT.

While the amount of coupling agent necessary to completely coat particles of mineral filler for use in compositions of the invention will necessarily vary somewhat depending upon the particle size of the filler used, the coupling agent is generally present in coatings on particles of filler in amounts between about 0.15 and about 2 pph based on filler.

In addition to PBT and mineral filler coated with sulfonyl azido alkyl trimethoxy silane, molding resin compositions of the present invention may contain other resins and additives on an optional basis. Such other ingredients frequently include for instance impact modifiers, glass fiber, lubricants, flame retardents, etc. Such additional ingredients, where present, are frequently present in amounts between about 1 and about 20 wt. % of the total composition of the invention.

While the action of the above mentioned sulfonyl azido alkyl trimethoxy silane a coupling agent in coupling PBT to mineral filler is not completely understood, it is believed that this compound functions as an effective coupling agent for such purposes because it decomposes at normal molding temperatures to highly active nitrene species which subsequently reacts rapidly with PBT by an insertion mechanism. This ability to chemically react with PBT to bond the PBT polymer to the mineral filler distinguishes the coupling agent of the present invention from other known coupling agents with respect to usefulness in coupling PBT to mineral filler materials.

Mineral filler, the individual particles of which are coated with sulfonyl azido alkyl trimethoxy silane as a coupling agent for use in the product and process of the invention, may be prepared by coating the coupling agent onto the particles of filler in any suitable manner. A preferred method for accomplishing such coating involves mixing particles of mineral filler with a solution of sulfonyl azido alkyl trimethoxy silane in a solvent for the silane. Suitable solvents include for instance perchloroethylene, carbon tetrachloride, methylene chloride, and methylene chloride-methanol mixtures with methylene chloride being a preferred solvent. While amount of solvent used is not critical, the silane coupling agent is normally dissolved in amounts between about 1 and about 25 wt. % of the sulfonyl azido alkyl trimethoxy silane based on solvent. Generally 1-2% water is added to the silane and solvent mixture to facilitate eventual hydrolysis of the silane alkoxy groups to provide anchorage to the filler. Mixing of mineral filler particles with a solution of coupling agent and subsequent removal of excess solvent may be done in a conventional manner such as by mixing the particles thoroughly with the solution so as to completely coat the particles, filtering the thus formed slurry to remove excess solvent and then air drying the wet coated particles to completely remove solvent and leave dry particles coated with the sulfonyl azido alkyl trimethoxy silane. Alternatively the slurry may be merely poured into large pans in thin layers and allowed to air dry.

Coated particles of mineral filler may be blended with PBT of appropriate IV in any suitable manner such as by dry blending PBT pellets or preferably PBT powder with silane treated mineral filler followed by extrusion compounding, banbury mixing or other suitable processing technique to give a uniform melt blend of filler and resin. Processing temperature should be kept low (generally under 235° C.) to minimize resin-filler chemical coupling until filler and resin are thoroughly mixed to insure uniform coupling of resin and filler. Likewise the production of molded products from molding compositions of the invention may be by any suitable conventional molding techniques appropriate to PBT with conventional injection molding or blow molding being preferred. Such molding procedures typically involve temperatures between about 235° C. and about 260° C., which temperatures are sufficient to decompose the sulfonyl azido alkyl trimethoxy silane into a highly reactive nitrene species which then reacts with the PBT as mentioned above to couple the PBT to the mineral filler. The effect of such chemical coupling is to render the mineral filler a true reinforcing filler rather than merely inert resin extender.

The following examples illustrate the possible embodiments of the invention, but are not intended to limit the scope of the invention.

EXAMPLE I

This example illustrates the use of sulfonyl azido alkyl trimethoxy silane in coupling PBT to glass microspheres incorporated therein to form a molding composition suitable for the molding of articles having improved physical properties as opposed to articles molded from PBT reinforced with glass microspheres, but not containing the coupling agent. The glass microspheres used in this example were those available commercially from Potters Industries and are known as "3,000 CP glass microspheres." These microspheres have an average diameter of about 10 microns. For this example a slurry of 2,000 grams of the 3,000 CP glass microspheres and 5,000 millimeters of methylene chloride was formed. To this slurry was added 80 grams of sulfonyl azido alkyl trimethoxy silane in the form of a 25% active solution in methylene chloride. The entire mixture was placed in a 5 gallon plastic carbuoy. After rotating the carbuoy for 3 hours on a roller, the slurry was filtered to remove solvent and the wet residue was dried at 40° C. in a circulating air oven to remove the remainder of the solvent. The dry coated microspheres were then dry blended with 1.1 IV PBT resin powder with less than 30 mesh average particle size in an amount of 15 wt % glass spheres based on resin. The dried microspheres thus blended with the PBT had been previously coated with 1 pph based on mineral filler of the same sulfonyl azido alkyl trimethoxy silane used in Example I.

The blend of PBT resin with coated filler obtained as described immediately above was then extrusion compounded and injection molded to provide test specimens as required by the ASTM procedures referred to in Table I below. Extrusion and molding were carried out under the following conditions:
Extrusion Conditions:
Screw rpm 75
Barrel temperatures 200, 200, 230, 240, 250
Molding Conditions:
Total cycle Injection time—2 sec.
Mold closed—15 sec.
Barrel temperatures 250, 250
Nozzle temperature 250° C.
Screw rpm 75
Injection pressure 1100 psi For comparison, test specimens similar to those described immediately above were produced by the same molding conditions from unfilled 0.8 IV PBT resin and from such resin containing 15 wt. % based on resin of 3,000 CP glass microspheres without the coating of sulfonyl azido alkyl trimethoxy silane.

Mechanical properties of the test specimens produced as described in this example were measured and found to be as reported in Table I below. The values reported are average values.

TABLE I

|  | Specific Gravity | Tensile Yield Strength PSI ASTM-D-638 | Flexural Strength PSI ASTM-D-790 | Flexural Modulus ×10³ PSI ASTM-D-790 | Notched Izod Impact ft.lbs./ins. ASTM-D-256 | Unnotched Izod Impact ft.lbs./ins. ASTM-D-256 | Heat Deflection 264 PSI °C ASTM-D-495 | Arc Resistance sec. ASTM-D-495 | dielectric strength short time volts/mil ASTM-D-149 |
|---|---|---|---|---|---|---|---|---|---|
| Unfilled 0.8 I.V. PBT Resin | 1.29 | 7352 | 12,096 | 359 | .80 | 33.8 | 51 | 189 | 358 |
| .15% 3000 CP glass microspheres in 0.8 IV PBT | 1.39 | 6620 | 11,986 | 456 | .63 | 5.56 | 57 | 124 | 371 |

TABLE I-continued

| | Specific Gravity | Tensile Yield Strength PSI ASTM-D-638 | Flexural Strength PSI ASTM-D-790 | Flexural Modulus $\times 10^3$ PSI ASTM-D-790 | Notched Izod Impact ft.lbs./ins. ASTM-D-256 | Un-notched Izod Impact ft.lbs./ins. ASTM-D-256 | Heat Deflection 264 PSI °C ASTM-D-495 | Arc Resistance sec. ASTM-D-495 | dielectric strength short time volts/mil ASTM-D-149 |
|---|---|---|---|---|---|---|---|---|---|
| resin 15% 3000 CP glass microspheres coated with 1 phr sulfonoyl azido alkyl trimethoxy silane | 1.39 | 7292 | 12,501 | .440 | .61 | 6.86 | 59 | 129 | 368 |

EXAMPLE II

Test specimens of molded PBT resin as described in Example I were prepared from unfilled 0.8 IV PBT resin, from 0.8 IV PBT resin blended with 15 wt. % based on resin of uncoated fibrous wollastonite F-1 filler and from 0.8 VI PBT resin blended with 15 wt. % based on resin of fibrous wollastonite F-1 filler coated with 1 pph sulfonyl azido trimethoxy silane. The wollastonite filler used had an average particle diameter of about 4 microns. Physical properties of the molded test specimens were as indicated as Table II below.

TABLE II

| | Specific Gravity | Tensile Yield Strength PSI ASTM-D-638 | Flexural Strength PSI ASTM-D-790 | Flexural Modulus $\times 10^3$ PSI ASTM-D-790 | Notched Izod Impact ft.lbs./ins. ASTM-D 256 | Un-notched Izod Impact ft.lbs./ins. ASTM-D 256 | Heat Deflection temp. at 264 PSI °C ATSM-D-648 | Arc Resistance sec. ASTM-D-495 | Dielectric strength short time volts/mil ASTM-D-149 |
|---|---|---|---|---|---|---|---|---|---|
| Unfilled 0.8 IV PBT resin | 1.29 | 7352 | 12,096 | 359 | .80 | 33.8 | 51 | 189 | 358 |
| 15% wollastonite F-1 in 0.8 IV PBT resin | 1.42 | 7412 | 13,052 | 500 | .63 | 3.90 | 57.5 | 128 | 381 |
| 15% Wollastonite F-1 treated with 1 phr sulfonyl azido alkyl trimethoxy silane in 0.8 IV PBT resin | 1.41 | 8004 | 13,454 | 503 | .62 | 3.88 | 58 | 135 | 385 |

From Tables I and II above it can be seen that physical properties of the specimens molded from filled PBT resin in which the mineral filler was coated with sulfonyl azido alkyl trimethoxy silane in accordance with the invention were superior in a number of respects to physical properties of the specimens molded from the PBT containing uncoated filler. Most notably, tensile yield strength was dramatically improved, with lesser improvements in flexural strength and heat deflection temperature. These improvements would not be expected with any of the other known resin coupling agents.

While the invention has been described above with respect to preferred embodiments thereof, it will be understood by those skilled in the art that various changes and modifications may be made without departing from the spirit or scope of the invention.

What is claimed is:

1. A molding resin composition comprising an intimate blend of polybutylene terephthalate having an intrinsic viscosity between about 0.5 and about 1.5 deciliters per gram with mineral filler, individual particles of said mineral filler being coated with sulfonyl azido alkyl trimethoxy silane.

2. Molding composition according to claim 1 wherein the mineral filler is present in amounts between about 1 and about 70 wt. % based on polybutylene terephthalate.

3. Molding resin according claim 2 wherein the filler has an average particle diameter of between about 0.1 and about 500 microns.

4. Molding resin according to claim 2 wherein the mineral filler is glass spheres, wollastonite or a mixture thereof.

5. Molding resin according to claim 2 where in coupling agent coated on the particles of mineral filler is present in amounts between about 0.15 and about 2 pph based on mineral filler.

6. Molding resin according to claim 1 wherein the mineral filler is glass spheres, wollastonite or a mixture thereof and has an average particle diameter of between about 0.1 and about 500 microns, the mineral filler is present in amounts between about 1 and about 70 wt. % based on PBT and the coupling agent coated onto the particles of filler is present in amounts between about 0.15 to 2 pph.

7. Process for preparing molding resin comprising intimately blending polybutylene terephthalate having an intrinsic viscosity between about 0.5 and about 1.5 deciliters per gram with mineral filler individual particles of which are coated with sulfonyl azido alkyl trimethoxy silane coupling agent.

8. Process according to claim 7 wherein the mineral filler is used in amounts between about 1 and about 70 wt. % based on polybutylene terephthalate.

9. Process according to claim 8 wherein the mineral filler has an average particle diameter between about 0.1 and about 500 microns.

10. Process according to claim 8 wherein the mineral filler used is glass spheres, wollastonite, novaculite, mica, or processed mineral fiber mixture thereof.

11. Process according to claim 8 wherein the coupling agent is used in amounts between about 0.15 and about 2 pph based on mineral filler.

12. Process according to claim 8 wherein the mineral filler is particles of glass spheres, wollastonite, mica, novaculite, processed mineral fiber or a mixture thereof and wherein The mineral filler has an average particle diameter between about 0.1 and about 500 microns and a coupling agent is used in amounts between about 0.15 and about 2 pph based on mineral filler.

13. Process according to claim 8 wherein the particles of mineral filler are coated by mixing the same with a solution of the silane coupling agent dissolved in a solvent for said coupling agent.

14. Process according to claim 13 wherein the solvent is methylene chloride.

15. A molded polybutylene terephthalate product produced from the molding composition of claim 1.

16. Molded polybutylene terephthalate product produced from the molding resin composition according to claim 6.

* * * * *